Figure 1:
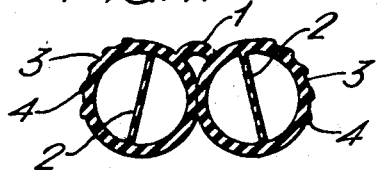

United States Patent

[11] 3,603,055

| [72] | Inventor | Oivind Dale<br>Ostre Kamford, Sandefjord, Norway |
|---|---|---|
| [21] | Appl. No. | 780,526 |
| [22] | Filed | Dec. 2, 1968 |
| [45] | Patented | Sept. 7, 1971 |
| [73] | Assignee | Olav Dale |
| [32] | Priority | Dec. 4, 1967, July 31, 1968 |
| [33] | | Norway |
| [31] | | 170,814 and 3003/68 |

[54] JOINT-SEALING HOSE
8 Claims, 8 Drawing Figs.

[52] U.S. Cl.................................................. 52/403, 94/18
[51] Int. Cl..................................................... E04b 1/36
[50] Field of Search........................................... 53/396, 403; 94/18, 18.2, 51; 49/498

[56] References Cited
UNITED STATES PATENTS
| 2,068,035 | 1/1937 | Meyer............................ | 52/396 X |
| 3,276,336 | 10/1966 | Crone............................ | 94/18 |
| 3,308,726 | 3/1967 | Dreher.......................... | 94/18 |
| 3,324,775 | 6/1967 | Crone............................ | 94/18 X |

FOREIGN PATENTS
| 804,758 | 11/1958 | Great Britain................ | 52/403 |
| 914,177 | 12/1962 | Great Britain................ | 52/403 |
| 956,706 | 4/1964 | Great Britain................ | 94/18 |

*Primary Examiner*—Alfred C. Perham
*Attorney*—Watson, Cole, Grindle & Watson

ABSTRACT: An elastomeric joint-sealing hose adapted to be inserted in the joint between a pair of members, wherein the hose is constructed of a pair of elongate tubes interconnected along one portion of their length, each tube having an integral, longitudinally extending, thin partition wall which is placed in tension upon insertion of the hose into the joint whereby the resistance to compression of each tube in the joint will be increased to thereby improve the seal of the joint.

PATENTED SEP 7 1971

3,603,055

INVENTOR
Øivind Dale
BY
Watson, Cole, Grindle & Watson
ATTORNEY

JOINT-SEALING HOSE

The present invention relates to a joint-sealing hose, which can be produced by extruding a suitable material such as rubber or a thermoplastic material. The hose is adapted to be used as a seal between various types of building or structural elements. Thus the hose can be used as a seal between elements made from wood, concrete, steel, etc. for indoor as well as outdoor applications.

The invention has for its object to provide a joint seal hose, the cross section profile of which is so devised that an effective and durable seal of the joint may be obtained. Such is obtained by arranging the joint seal hose so that it consists of one or more cylindrical cavities for allowing the seal to be easily mounted in any desired position. The cavities are divided along their length by a central, longitudinally extending partition wall, the plane of which substantially extends in the direction of the joint after the hose has been brought into its desired position. By such an arrangement the partition walls are tensioned somewhat during the compression of the mounted hose in the joint. The outer walls of the hose are therefore kept in a firm and positive surface contact.

Various elastomeric hoses are available for use in sealing joints between building elements and other type members and some of them are also designed with interior partition walls. However, such partition walls are normally intended to extend across the joint so as to be compressed after the hose is compressed into the joint. According to the present invention, however, the partition wall or walls for the hose extend(s) in the direction of the joint whereby as mentioned a "tension stay effect" is obtained, which is a more effective and positive manner of insuring the engagement of a substantially greater surface of the hose exterior against the joint sides. This partition wall or "tension stay" is preferably of a relatively small thickness as compared to the hose itself. For those crosswise extending partition walls this relatively small thickness was not possible since such partition walls were designed for use as a support for the hose across the joint. The partition wall for the hose according to the present invention, however, serves as tension or stretch element. In accordance with one embodiment of the invention the joint-sealing hose bodies are connected by an elastomeric bridge, each hose body being provided with one or more partition walls and each so arranged as to extend substantially in the plane of the joint when the hose is inserted.

According to another embodiment the hose is split along its length so that it is divided into two halves which are connected along one side of the split, each half having at least one partition wall or confining wall which extends substantially in the plane of the joint after the hose is mounted. By splitting the hose in this way and providing the two halves with conveniently extending longitudinal partition walls which have the effect of a tension stay by the deformation of the hose during the mounting, a very favorable seal is obtained. The considerable tension stress which arises in these partition walls during mounting will effect a bend in the outer walls of the hose due to the split, and an effective seal is produced. The dimensioning of the partition wall as well as the outer hose walls must be so made that the tension will not be too strong in relation to the outer walls of the hose. Accordingly a bead may be provided in the vicinity of the split to prevent the outer walls from being bent entirely between the two halves during the mounting.

In order to more fully understand the invention reference is made to the accompanying drawing in which the embodiments are shown.

Figure 2:
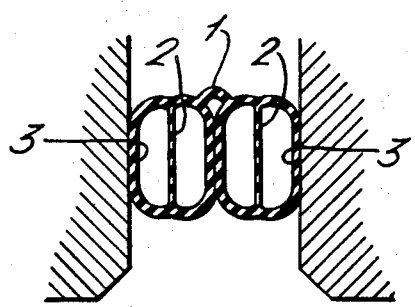
Figure 3:
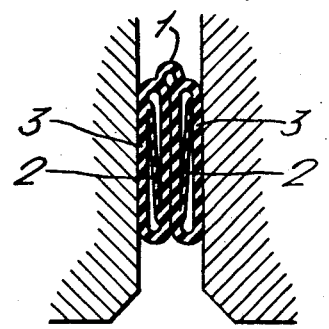

FIG. 1 is a cross section of a joint sealing hose according to one embodiment of the invention, and FIGS. 2 and 3 show such a hose in its mounted position in each of two different-sized joints.

Figure 4:
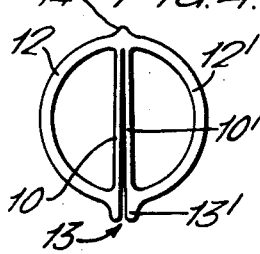
Figure 5:
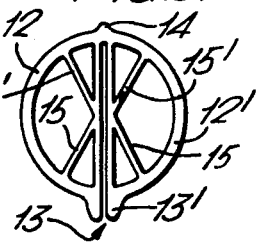
Figure 6:
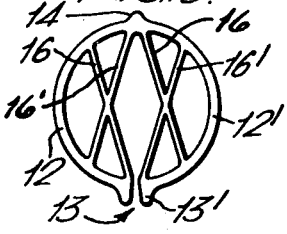
Figure 7:
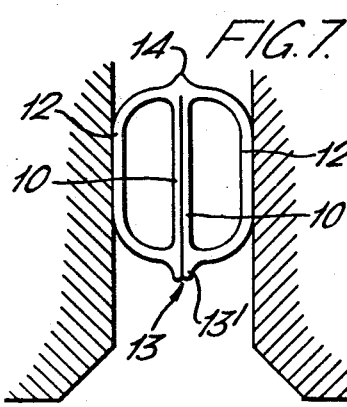
Figure 8:
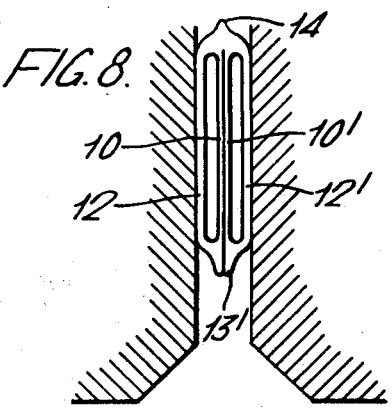

FIGS. 4, 5, and 6 each show modified embodiments wherein the hose is split, and FIGS. 7 and 8 each show the hose according to FIG. 4 mounted in respectively different-sized joints.

The hose according to the embodiment shown in FIG. 1 consists of two parallel circular-cylindrical hose bodies 3, each provided with a longitudinally extending partition wall 2. The two hose bodies are connected by a U-formed bridge or rib 1 which can also serve as a pull element during the introduction of the sealing hose in a joint. The outer surface of the hoses 3 are suitably provided with knurlings or ribs 4.

It will be understood that the embodiment shown in FIG. 1 can be modified in several ways without departing from the invention directed to a joint-sealing hose with at least one cavity in which one or more partition walls are arranged so that when the hose is mounted in the joint, the partition walls extend substantially in the direction of the joint so as to effect a "tension stay."

Also the U-formed connecting bridge 1 will for the joint-sealing hose, as shown in FIG. 1, enhance the effective sealing characteristics of the hose since the bridge itself serves as a tension or stretch member. The bridge also effectively insures that the joint-sealing hose will not be dislodged when the mounting tool is removed.

With a sealing hose of the type shown in FIG. 1 consisting of two similar hose bodies connected with a bridge, placement in the joint can be carried out by means of tools which are introduced between the hoses to rest against the bridge. The sealing hose can thus be pulled to its intended location in the joint. Also the bridge makes possible the provision of a relatively thin and highly elastic joint-sealing hose thereby saving the cost of material. This is an advantage over other known joint-sealing hoses which must have an increased wall thickness and a certain rigidity of its material if the mounting is to be carried out by pushing the hose into the joint.

In FIGS. 4 to 6 certain modifications of the hose according to the invention are shown. These modifications consist of two halves 12—12,', each constituting substantially a half-circular cylinder, the two halves being connected at 14. This connection 14 preferably has a somewhat thicker wall than the remainder of the hose wall and may be formed with a protruding longitudinal bead as shown in the drawing. In FIG. 4 each of the two halves 12—12' is provided with a first partition wall 10—10' extending parallel and adjacent to one another in the direction of the joint when the hose is mounted, i.e. extending from connection 14 to the orifice 13 of the slit.

FIGS. 7 and 8 clearly show how the partition walls 10—10' will have the effect of the tension stay when the hose is mounted in a relatively open and relatively narrow joint.

FIG. 5 shows a hose profile similar to that shown in FIG. 4, but is provided with a pair of second, further partition walls 15—15' to obtain an enhanced stay or bracing effect by the compression of the hose, whereby a more favorable stability may be obtained in the joint and the oblique mounting in the joint will not produce any drawbacks. Also, the hose will not tend to stretch during the mounting in the joint due to oblique tension action of the partition walls.

FIG. 6 shows an embodiment wherein the partition walls 16—16'intersect, third walls 16 being similar to walls 10—10' except for their angularity and still further fourth walls 16' intersecting therewith. At the orifice 13 of the slit the hose in the embodiments disclosed are provided with protruding wells 13'. The hose according to the invention can also be designed as having other cross section profiles. The characteristic feature is that the hose consists of two halves which are connected along one side with the opposite side being slit or having no connection as in FIG. 1.

With the use of thin partition walls the thickness of the hose can be reduced without reducing the stability and effectiveness of the joint-sealing hose. An effective saving of material can also be obtained.

Various parts of the hose may be provided with known knurlings or ribs to increase the engagement in the joint and further make sealing more effective. Also other modifications are possible within the scope of the invention. What is described above and disclosed in the drawings is therefore to be understood as being elucidating examples without having a restricting effect.

I claim:

1. An elastomeric joint-sealing hose adapted to be inserted in the joint between a pair of members having parallel end walls, comprising a pair of elongate tubes each being defined by a continuous wall having the configuration of one-half of a longitudinally split circular cross-sectional hose, one portion of the wall of each tube being a half circle and the remaining portion of the wall of each said tube being defined by a first, longitudinally extending thin partition wall extending between and connecting the two ends of said half circle wall portion, two ends of said pair of tubes being interconnected and said first partition walls extending in the same direction from said connections in substantially parallel relationship whereby, upon insertion of the hose into the joint, the resistance to compression of each said tube will be increased as said first partition walls are each placed in tension to thereby improve the seal of the joint.

2. The hose according to claim 1 further comprising a pair of second, integral, longitudinally extending, thin partition walls within each said tube, each said pair of second partition walls connecting said first partition wall of each tube with each said half-circle wall partition and each of said second partition walls of each said pair lying obliquely to said first partition walls.

3. The hose according to claim 2 wherein a longitudinally extending head is provided along the interconnection between said tubes and along each said tube opposite said interconnection.

4. An elastomeric joint-sealing hose adapted to be inserted in the joint between a pair of members having parallel end walls, comprising a pair of elongate tubes each being defined by a continuous wall having the configuration of one-half of a longitudinally split circular cross-sectional hose, one portion of the wall of each tube being a half circle and the remaining portion of the wall of each said tube being defined by portions of a third and a fourth, longitudinally extending thin partition wall, two ends of said pair of tubes being interconnected, each of said third partition walls extending between and connecting one end of each said half circle wall portion with the inner side of each said half circle wall portion each of said fourth partition walls extending between and connecting the other end of each said half circle wall portion with the inner side of each said half circle wall portion, said third and fourth partition walls being arranged to intersect along their respective centerlines whereby, upon insertion of the hose into the joint, the resistance to compression of each said tube will be increased as said partition walls are each placed in tension to thereby improve the seal of the joint.

5. The hose according to claim 4 wherein a longitudinally extending bead is provided along the interconnection between said tubes and along each said tube opposite said interconnection.

6. An elastomeric joint-sealing hose adapted to be inserted in the joint between a pair of members having parallel end walls, comprising a pair of elongate tubes each of a constant circular cross section in tangential contact with one another, and being interconnected along one portion of their length by means of a longitudinally extending U-shaped rib on one side of the tangential contact area, each said tube having a longitudinally extending thin partition wall therein each extending between and connecting portions of the inner side of each said tube, said partition walls being so disposed so as to diverge away from said U-shaped rib whereby, upon insertion of the hose into the joint, the resistance to compression of each said tube will be increased as said partition walls are each placed in tension to thereby improve the seal of the joint.

7. The hose according to claim 6 wherein longitudinally extending ribs are provided along the outer surface of each said tube.

8. The hose according to claim 7 wherein the thickness of said partition walls are each substantially less than the thickness of each said tube.